(12) United States Patent
Heiskanen et al.

(10) Patent No.: US 8,728,592 B2
(45) Date of Patent: May 20, 2014

(54) CONTAINER FROM FIBRE BASED BOARD AND A METHOD FOR PRODUCING SUCH A CONTAINER

(75) Inventors: Isto Heiskanen, Imatra (FI); Timo Raisanen, Heinola (FI); Jari Rasanen, Imatra (FI); Titta Lammi, Imatra (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 13/697,694

(22) PCT Filed: May 19, 2011

(86) PCT No.: PCT/IB2011/052199
§ 371 (c)(1),
(2), (4) Date: Nov. 13, 2012

(87) PCT Pub. No.: WO2011/145073
PCT Pub. Date: Nov. 24, 2011

(65) Prior Publication Data
US 2013/0056383 A1      Mar. 7, 2013

(30) Foreign Application Priority Data
May 21, 2010   (SE) ..................... 1050510

(51) Int. Cl.
| B32B 1/02 | (2006.01) |
| B65D 3/00 | (2006.01) |
| B65D 5/56 | (2006.01) |
| B65D 5/62 | (2006.01) |
| B65D 6/14 | (2006.01) |
| B65D 8/04 | (2006.01) |

(52) U.S. Cl.
USPC ......... 428/34.2; 428/35.7; 162/100; 162/231; 220/62.11; 220/62.12; 220/62.15; 220/62.19; 220/62.2; 220/62.22; 220/677; 220/678; 206/524.3; 229/4.5; 229/5.81; 229/5.84; 229/400

(58) Field of Classification Search
USPC .......... 428/34.1–34.3, 35.2, 35.5–35.7, 36.1, 428/36.4, 36.5, 36.9, 36.91, 36.92, 40.1, 428/40.2, 41.7, 42.2, 42.3, 57, 58, 61, 64.1, 428/66.3–66.5, 66.7, 81, 84, 98, 105, 113, 428/119–121, 141–144, 147, 151–154, 158, 428/159, 165, 168, 171, 172, 174, 187–192, 428/195.1, 200, 211.1, 220, 221, 292.1, 428/292.4, 292.7, 304.4, 332, 337, 339, 428/357, 408, 409, 532, 537.1, 537.5, 428/542.8, 903.3, 911; 162/100, 109, 162/123–125, 127–129, 135, 146–147, 149, 162/157.6–157.7, 158, 164.1, 176–177, 162/180, 181.1, 188, 218, 231; 220/592.01, 220/592.16–592.17, 592.2, 592.21–592.22, 220/592.28, 62, 62.11–62.12, 62.15, 62.19, 220/62.2, 62.22, 656–657, 660, 677, 678, 220/682, 689–690, 694, 703; 206/139, 427, 206/446, 485.1, 499, 502, 524.1, 524.3, 206/524.6, 829; 229/100, 103.11, 229/122.27–122.28, 183–185, 185.1, 186, 229/190, 193, 4.5, 400, 403, 5.5, 5.81, 5.84, 229/93, 67

See application file for complete search history.

(56) References Cited

U.S. PATENT DOCUMENTS

| 1,610,192 | A |   | 12/1926 | Barbieri |
| 4,867,374 | A |   | 9/1989 | Murray et al. |
| 5,769,311 | A | * | 6/1998 | Morita et al. ................. 229/403 |
| 6,190,744 | B1 | * | 2/2001 | Akao et al. .................... 428/34.2 |
| 6,257,485 | B1 | * | 7/2001 | Sadlier et al. ................. 229/403 |
| 2001/0038893 | A1 |   | 11/2001 | Mohan et al. |
| 2004/0234802 | A1 |   | 11/2004 | Hubinette et al. |
| 2006/0027640 | A1 |   | 2/2006 | Smith et al. |

OTHER PUBLICATIONS

International Search Report and Written Opinion, mailed Sep. 22, 2011 from the ISA/SE.
D3: Gavelin, G., "2.5 Maldlimning av kartongnnassor" I: Papp och Kartong, Skogsindustrins Utbildning i Markaryd AB; Sum AB, Markaryd, 1995, sid. 94-96, ISBN: 91-7322-182-1, se sid. 94 (with English translation).

* cited by examiner

Primary Examiner — Walter B Aughenbaugh
(74) Attorney, Agent, or Firm — Greer, Burns & Crain, Ltd.

(57) ABSTRACT

The present invention relates to a container made from fiber based board wherein the container comprises a sleeve and a bottom, said bottom comprises polymer coated board, at least one side of said sleeve is uncoated and the sleeve is formed by sealing two edges of the sleeve together along a side seam. The invention further relates to a method for producing said container.

11 Claims, No Drawings

CONTAINER FROM FIBRE BASED BOARD AND A METHOD FOR PRODUCING SUCH A CONTAINER

This application is a U.S. National Stage under 35 U.S.C. §371 of International Application No. PCT/IB2011/052199, filed May 19, 2011, which claims priority from Swedish Patent Application No. 1050510-5, filed May 21, 2010.

FIELD OF INVENTION

The present invention relates to a container comprising a bottom and a sleeve. The present invention further relates to a method for producing said container.

BACKGROUND

Generally, polymer-coated board is used in containers and packages intended for liquid foodstuffs and other liquid-based or wet products. Typical products, which the packages and containers made of polymer-coated board are intended for, comprise different liquid and wet foodstuffs, such as milk products, water, juices, wine, coffee and other hot drinks, soups, desserts and processed food.

The inner polymer layer of a package or container protects the board against moistening and wetting and, depending on the polymer grade, provides an oxygen and/or flavour protection for the product contained in the dosed package. The polymer can also protect the board against the grease or fat contained in the product. Furthermore, the polymer coating makes it possible to heat-seal the board, when making the packages or containers. In addition to the polymer-coated inner surfaces, the inner cutting edges or so-called raw edges of the cardboard package or container may be exposed to the wet or liquid product, the liquid being possibly absorbed into the board through the edges. To avoid this, the board may be folded around its edges, so that the raw edges are hidden inside the casing of the seamed package or container or that they are turned onto its outer surface, or the edge of the board may be skived and thereafter folded double, so that the raw edge is closed. Another approach to the problem of absorption of the raw edges has been to prevent the absorption by suitable sizes of the board.

Another way of making a board container or package impermeable to liquid and gas is to provide the board used for the packaging with a metal foil. However, the disadvantages of such packaging include high manufacturing costs, non-biodegradability of the foil layer and problems of regeneration of the packaging material.

It is becoming more and more important that packages are environmental friendly, i.e. that they are recyclable and/or biodegradable. A big advantage with a fiberbases package is that they are recyclable. However, the fiberbased containers or packages for packaging food or liquids used today are either foil or polymer laminated making it more difficult to recycle the used packages.

The use of biodegradable polymers in the coating of containers and cups is an alternative. However, the presence of polymers, biodegradable or not, still causes problems during recycling of the board since the pulpability of the board is detracted. Furthermore, the biodegradable polymers are very expensive and more difficult to extrude to a board.

Thus, there is a need for a more environmentally friendly container which is more economically beneficial to produce at the same time as it is suitable for packaging food and/or liquids.

SUMMARY OF THE INVENTION

It is an object of the present invention to provide an environmental friendly container which is suitable for packaging products, such as food and/or liquids.

It is also an object of the present invention to provide a container which is resistance against liquids and/or grease.

Yet another object of the present invention is a method for producing an environmental friendly container in an economical beneficial way.

This object and other advantages are achieved by the preferred embodiments of the container as described herein below.

The invention relates to a container made from fiber based board wherein the container comprises a sleeve and a bottom, said bottom comprises polymer coated board, at least one side of said sleeve is uncoated and the sleeve is formed by sealing two edges of the sleeve together along a side seam.

It has been shown that the combination of uncoated board on at least one side of the sleeve and polymer coated board on the bottom of the container is sufficient in order to produce a container which is resistant against liquid and/or grease. The container according to the invention is thus suitable for packaging of both food and/or liquids.

It is preferred that the side of the sleeve facing the inner side of the container is uncoated. It has been shown that uncoated board on a sleeve of a container has sufficient resistance against liquid and/or grease when it is combined with polymer coated board on the bottom. The uncoated board used may be any conventional board used for packages. If the package should contains food or other products which will be consumed it is important that board fulfills the requirement of a food board.

The side seam is preferable resistant against liquid and/or grease. The side seam is preferable covering the raw edges of the sleeve. The raw edges of the sleeve, i.e. the cut edges of the sleeve, is where a container made from fiber based material is the most sensitive to penetration of liquid or grease. By covering the raw edges, preferable by a tape, they are covered and thus no liquid or grease can penetrate into the container.

The edges of the sleeve are preferable overlapping. In this way, the raw edges of the sleeve covered in a more secure way when they are sealed along the seam.

It is preferred that the bottom and the sleeve of the container is attached to each other by heat-sealing. Since the bottom of the container comprises polymer coated board it is possible to heat-seal the sleeve and the bottom to each other.

The fiber based board is preferable provided with increased sizing level. Increased sizing level will also improve the container's resistance against liquid or grease, i.e. its resistance against the packaged product. The sizing level depends on the end use of the product. If the container is containing liquid the Cobb value (water absorption) of the uncoated board of the sleeve, facing the inner side of the container, should be below 25 g/m2 (60 sec) measured according to ISO 535. The uncoated fiber based board may have a long time resistance against water, preferable a Cobb value (water) below 100 g/m2 (1 h) measured according to ISO 535.

The container is preferable in the form of a cup.

The invention further relates to a method for producing a paperboard container comprising a bottom and a sleeve, wherein the bottom comprises polymer coated board, at least one side of the sleeve comprises uncoated board and wherein at least two edges of the sleeve is sealed together along an seam forming a sleeve and the bottom part and the sleeve are attached to each other forming said container.

The seam is preferable subjected to heat which melts the side seam so that the two edges of the sleeve are sealed. In this way a tight seal, i.e. a seal which is resistant against liquid and/or grease is formed.

The sleeve and the bottom are preferable attached to each other by heat-sealing. Heat-sealing is a well known technique and it is preferred to use this technique when forming the container. In this way it is possible to use conventional machines for heat-sealing packages.

DETAILED DESCRIPTION

It has surprisingly been found that the use of uncoated board on a sleeve of a container in combination with a polymer coated board in the bottom gives a container with good resistance against for example liquid and/or grease.

By decreasing the amount of polymers of the container, due to decreased amount of polymer coated board, and still be able to receive good resistance against liquids and/or grease, it is possible to produce a more environmental friendly container. Surprisingly and against previous knowledge it has been shown that a fiber based board can resist liquids and/or grease much better than expected. It has been shown that by protecting the bottom and the side seam of the sleeve of a container, sufficient protection against packaged products, such as food and/or liquids, are achieved.

The container consists of at least two parts, one sleeve and one bottom. The bottom comprises polymer coated board and is formed in any conventional shape. If the container is in the form of a cup, the bottom is preferable rounded. Any conventional polymer coating can be used. It is preferred to use heat-sealable polymers and/or biodegradable polymers. Since the total amount of polymers in the container is reduced, the cost for using biodegradable polymers is not that high and it is therefore possible to use biodegradable polymers and still be able to produce a cost efficient container.

The sleeve comprises an uncoated board on at least one side. The uncoated board preferable forms the inside of the container. The sleeve is formed by connecting two edges of the board together, either by overlapping or abutting the edges and thereafter sealing the edges together along a seam. The seam is preferable formed by a tape which is heated and thus forms a seam which is resistant against liquid and/or grease. In this way the edges, i.e. the raw edges, of the sleeve is protected against the liquid and/or grease of the packed product. Depending on the end use different demands on for how long the sealed seam must be able to withstand the strain of the packed product.

The bottom and the sleeve are preferable attached to each other by the aid of heat-sealing and thereby forming said container. Since the bottom comprises polymer coated board it is possible to heat-seal the bottom and the formed sleeve to each other in a conventional way. The bottom may also be glued to the sleeve.

The side of the sleeve which faces the inside of the sleeve is preferable uncoated, i.e. there is no polymer coating or mineral coating on the surface of the board. The other side, forming the outside of the sleeve of the container may be coated, preferable mineral coated in order to provide the container with good printing properties.

The fiber based board may be internally or surface sized. Depending on the product packed in the container and the end use of the container, the board may be provided with internally sizing and/or surface sizing. The sizing will reduce the porosity of the board. If the container will comprise liquid a hydrophobic size may be added to the board. If the container will comprise products with a greasy surface, such as food or oily spare parts, the board may comprise a surface sizing with surface blocking tendencies. Commonly used sizing agents are starch, PVA, CMC, SA (styrene acrylate emulsions), SAE (modified styrene acrylic co-polymers, SMA (styrene maleic anhydride, fluorochemicals, polyurethane, AKD and ASA, but other known sizing agents may also be used. It may be preferred to use both a hydrophobic sizing agent and a surface sealing additive.

It may be preferred to increase the sizing level of the board. Depending on the sizing used, different amounts of sizing is needed in order to achieve the desired resistance against liquid and/or grease. For example, the amount of AKD sizing should be above 1 kg/t, amount of ASA sizing should be above 0.75 kg/t, amount of rosin sizing should be above 2 kg/t.

By adding sizing either internally or to the surface of the board the board's resistance against liquids, such as water, and grease, such as oil, fat etc, increases. If the container will comprise liquid it is preferred that the uncoated side of the board of the sleeve has a Cobb value (water absorption) below 25 g/m2 (60 sec) measured according to ISO 535. If the container should be used for longer storage of liquid it is preferred that the Cobb value is below 20 g/m2 (60 sec). The Cobb value (1 h water) is preferable below 100 g/m2, more preferable below 80 g/m2 and even more preferable below 60 g/m2. The amount of sizing used, if the board should resist liquid for a longer time, may for example be AKD sizing above 2 kg/t, ASA sizing above 1.25 kg/t or rosin sizing above 3 kg/t.

Another advantage with the container according to the invention is that it is often sufficient to size one side of the paperboard used in the container. In this way costs are reduced and the runnability improves. Furthermore, this container also makes it possible to only surface size the paperboard, i.e. there may be no need to add internal sizing in the middle ply of the board.

The bottom of the container comprises polymer coating which both increases the protection against liquid and/or grease and it also makes it possible for the sleeve and the bottom to be attached to each other by heat-sealing. Heat-sealing is a well known technique for sealing packages and making tight seals.

The shape of the container may vary, but one preferred shape is in the form of a cup. The sleeve of the cup can expand conically upwards. The conical cup corresponds to conventional drinking cups made of board. The cup may further comprise a rolled rim and other additional features related to a cup, such as a handle.

The container may be used for many different packages, for example as a drinking cup, for packaging of food, such as a container for take away food, for packaging of sweets or candy or for packaging metal or spare parts. However, other end uses may also be possible and within the scope of protection for the container according to the invention.

The fiber based board is preferable made from cellulose fibers. Any kind of fibers, both hardwood and softwood fibers may be used.

It is contemplated that there are numerous modifications of the embodiment described herein, which are still within the scope of the invention as defined by the appended claims.

The invention claimed is:
1. A container made from fiber based board comprising a sleeve and a bottom, wherein said bottom comprises polymer coated board, and said sleeve comprises a fiber based board that is sized to have a Cobb value below 100 g/m² for 1 hour measured according to ISO 535, wherein the sleeve of the container is uncoated with a polymer coating, and the sleeve is formed by sealing two edges of the sleeve together along a side seam.

2. The container according to claim 1 wherein the sleeve has raw edges that are covered by the side seam.

3. The container according to claim 1 wherein the sleeve has raw edges, and the side seam comprises a tape covering the raw edges of the sleeve.

4. The container according to claim 1 wherein the edges of the sleeve are overlapping.

5. The container according to claim 1 wherein the bottom is heat sealed to the sleeve.

6. The container according to claim 1 wherein the sleeve is sized to have a Cobb value below 25 g/m2 for 60 seconds measured according to ISO 535 on the inner side of the sleeve.

7. The container according to claim 1 wherein the container is a cup.

8. The container according to claim 1, wherein the size is an internal size.

9. The container according to claim 1, wherein the size is a surface size.

10. The container according to claim 1 wherein an exterior side of the sleeve has a mineral coating.

11. A container comprising,
   a polymer coated, fiber based bottom; and
   a fiber based sleeve sealed to the bottom, the sleeve being sized to have a Cobb value below 100 $g/m^2$ for 1 hour measured according to ISO 535, wherein the sleeve is free of polymer coatings.

* * * * *